United States Patent Office 3,498,801
Patented Mar. 3, 1970

3,498,801
PHOSPHATE OPAL GLASS
Robert Keul, Cormeilles-en-Parisis, France, assignor to Compagnie de Saint-Gobain, Neuilly-sur-Seine, France
No Drawing. Filed Aug. 8, 1966, Ser. No. 570,718
Claims priority, application France, Aug. 17, 1965, 28,472
Int. Cl. C03c *3/22, 3/08*
U.S. Cl. 106—39        6 Claims

ABSTRACT OF THE DISCLOSURE

Opal glass and method of preparing it, using as batch ingredients the approximate precentages by weight: $SiO_2$—66.2; $B_2O_3$—10; $Al_2O_3$—4.5; $P_2O_5$—5; CaO—1.5; MgO—0.8; $Na_2O$—12. The composition has the weight ratios $M_2O/P_2O_5 = 2$ to 3; $M_2O/CaO = 6$ to 11

$$\frac{P_2O_5 \times SiO_2}{M_2O} = 20 \text{ to } 30$$

where $M_2O$ is an alkali oxide principally $Na_2O$ but capable of containing $K_2O$ or $Li_2O$. The batch is melted at about 1500° C., gobs cut off and molded at 1230° to 1280° C., and the molded articles tempered at 700° to 720° C. The separation of the opalescent phase begins only when the glass is being shaped to final form and has been sufficiently cooled so that the viscosity of the matrix is so high as to prevent the growth of crystalline structure. The result is an opal glass having the appearance of perfect vitrification and greatly increased strength over prior art opal glass.

---

This invention relates to the manufacture of opal glass, to compositions for making it, to novel opal glass, and to tempered opal glass. It relates to industrial products in tempered opal glass, or in opal glass capable of being tempered.

Opal glass is known, but it has been difficult to temper it because of inherently inconsistent characteristics: when opalization has proceeded sufficiently to be satisfactory, the time required has been inconsistent with modern, high speeds of manufacture. In effect, to obtain satisfactory tempering, it is necessary that the glass shall be sufficiently homogeneous to be able to support the high strains of tension and compression which exist after tempering has been carried out in the depth of the glass, while the opacity of the opalization by its very nature implies a heterogeneous constitution.

A brief review of glass manufacture will establish some of the standard terms: the word "melting" has two meanings, the first referring to the entire process of making glass for formation into articles, and the second referring to the stage in which the solid batch is made into crude liquid glass by heat. After melting in the second sense, the glass is fined and after fining, it is cooled to working temperature, the temperature at which it is formed into objects such as tableware or into continuous sheets by appropriate machinery. Glass is greatly strengthened by tempering, a process in which glass at a temperature above its softening point is chilled with great rapidity, for example, by blowing it vigorously with cold air.

Heretofore, opal glasses have been generally incapable of withstanding the harsh strains imposed by tempering, the percentage of failures being too great to constitute a useful process.

It is an object of this invention to make tempered opal glass by modern, high speed methods of manufacture.

The objects have been accomplished by opal glass of which the working temperature is substantially above the temperature at which the opal phase forms and a method of preparing temperable opal glass which comprises preparing glass from glass batch containing $SiO_2$, $B_2O_3$, $Al_2O_3$, $P_2O_5$, CaO and $Na_2O$, with or without MgO, BaO and other alkali oxides, in proportions providing a working temperature above the temperature at which the opal phase forms, and cooling the glass. The discovery of an opal glass composition capable of being tempered followed upon my theory that prior failures were due to a type of heterogeneity existing in the glass and upon my concept that opal glass could be tempered if it were possible to attain a sufficient degree of homogeneity, which presupposed that the soild phase which lends opalescence and opacity previously existed in a gross form characteristic of advanced crystallization. It was part of the concept of the invention to discover means and methods by which a sufficient homogeneity could be established to enable the opalized glass to withstand the strains imparted by tempering.

As a result of these studies, I have conceived this novel method and novel composition and have achieved an opal glass which can be tempered. As a result of these labors, a very finely dispersed opalescence phase has been brought into existence by the utilization of a composition in which the separation of the opalescent phase does not commence until the glass, during shaping to its final form, has been sufficiently cooled so that the viscosity of the vitreous matrix is so high as to prevent the growth of crystalline germs and especially to prevent their uniting in aggregates of substantial size. It is necessary, in practice, that the temperature at which the opalescent phase separates shall be substantially below the working temperature of the glass, taking the working temperature to be that of the glass just before it is shaped. If, on the contrary, the opalescent phase begins at the working temperature or above it, there is substantial probability that a gross phase will appear, not only because the viscosity of the vitreous matrix is too low, but also because in certain cases the glass remains a long time at that temperature.

In practice, the opalization develops immediately after the shaping of the articles and while they are cooling in the molds, which corresponds to temperatures on the order of 900° C. to 600° C. and at a viscosity approximating or above 100,000 poises. I have established that with this invention the premature separation of phases, which impairs temperability, is prevented, and especially, that the time during which the opalization develops is long enough for it to attain an industrially and commercially satisfactory intensity. The present invention has established the nature and proportions of the principal constituents of a preferred opal glass which conforms to the foregoing requirements; that is to say, that it withstands tempering, and when tempered, it acquires good resistance to thermal and mechanical shocks and in which opalization takes place in the relatively low temperature range of about 900° to 600° C.

By constituents of the glass are to be understood those ingredients which contribute to form the vitreous matrix, the presence of which establishes in good part the habitual characteristics of the glass; that is, viscosity, coefficient of expansion, and chemical resistance, and also those which form the opalescent phase.

In the present invention the phosphates are used as opalizing agents, and they have this especial advantage, that glasses which contain $P_2O_5$ have no problems of atmospheric pollution, whereas the opal glasses which use fluorine as an opalizing agent are troubled with this problem. The compounds which produce opalization in these phosphate glasses are essentially simple alkaline earth metal phosphates or mixtures of them, but alkali metals may also participate in the constitution of the mixed phosphates. The choice of the different metallic elements is of major importance, because the phase separation of the phosphates within the vitreous matrix, which produces the opalization, is a phenomenon analogous to the precipitation of a salt in a solution. Furthermore, the temperature at which the separation occurs during the cooling of the glass is related to the nature of the phosphates and the nature of the "solvent" phase which constitutes the vitreous matrix and to their relative proportions. That temperature is particularly related to the content of the glass in alkaline earth metal which will precipitate as phosphates, without neglecting the properties imparted by other elements of the vitreous medium in the formation of the opalizing phosphate. In the compositions of the present invention, the alkaline earth metal is preferably calcium, and I have established that a very small proportion of lime associated with a vitreous matrix appropriately containing $P_2O_5$ produces a vivid opal glass, economically, and of which the opalization does not occur before the transfer of the glass to the mold. In this way, a very homogeneous glass, susceptible of being shaped and worked under classic conditions and of being energetically tempered, is formed.

A practical method of estimating the degree of fineness of the opalescent phase is to examine the appearance of the broken face of a shaped article after fracture. With the glasses of this invention, the appearance is that of a perfectly vitrified material, when the working and shaping have been carried out under normal conditions. This is in distinction to the granular aspect of the prior art opal glasses which revealed a degree of crystallization or agglomeration far more advanced and incompatible with tempering. Even under unfavorable conditions, for example, when the glass has been kept a long time at the lowest working temperatures, for example, in making heavy articles, the face of a break appears clean and homogeneous. Under such unfavorable conditions, the break may have a matte appearance which indicates a structure somewhat less homogeneous than that which is produced under favorable conditions, but still constituting a product which can be satisfactorily tempered. The principal constituents which enter into the glass compositions of this invention and their limiting proportions are as follows:

| | Percent by weight |
|---|---|
| $SiO_2$ | 60–68 |
| $B_2O_3$ | 5–12 |
| $P_2O_5$ | 3–5.5 |
| $Al_2O_3$ | 4–8 |
| CaO | 1–2 |
| $M_2O$ | 9–13.5 | in which $M_2O$ is an alkali oxide, principally $Na_2O$, but capable of containing $K_2O$ or $Li_2O$; the weight ratio of $M_2O$ to $P_2O_5$ is between about 2 and 3, and the weight ratio of $M_2O$ to CaO is between 6 and 11. The partial replacement in $M_2O$ of sodium oxide by the oxides of other alkali metals, such as lithium or potassium, is interesting, especially when using raw materials of low cost containing these oxides.

The compositions of the invention may also include oxides of metals of the second group of the periodic classification of the elements (Mendeleeff) other than calcium, such as, for example, barium, magnesium and zinc, provided that their proportions do not exceed about 1.5% by weight of the total composition. These small contents of such oxides have little effect on the phenomenon of opalization, but they act favorably in other ways. For example, BaO serves to prevent devitrification.

It is difficult to depart from the limits set forth in the foregoing table: for example, the CaO content has a particular influence on the temperature at which the opalizing phase separates from the vitreous matrix, so that one is well advised to use a low percentage in a very limited range. The upper limit of this range should not be exceeded if the separation of the opalescent phase is to occur at a sufficiently low temperature (between 900° C. and 600° C.); that is to say, that it is to separate in a state of dispersion sufficiently fine to permit eventual tempering. On the other hand, one should not descend below the lower limit of this range if one wishes adequate intensity of opalization. The limits concerning $P_2O_5$ have been established for analogous reasons, but the limits may be less rigorously applied. The upper limit of the alkali oxide content should not be exceeded, because they act as solvents or anti-opalizers for the opal phase. Because of this, the content of $M_2O$ must be proportioned to the opalizing agents $P_2O_5$ and CaO. The lower limit for the alkali oxides and the upper limit chosen for $B_2O_3$ conserve a coefficient of expansion of at least $55 \times 10^{-7}$ for the glass, which is necessary if, under usual conditions, the glass is to withstand energetic tempering.

The upper and lower limits for $Al_2O_3$ and $B_2O_3$ permit the manufacture of glass at temperatures which are not too high. As to the upper limit for silica, it is chosen especially to assure complete vitrification at the usual molding temperatures for industrial glasses.

It is particularly important to have complete vitrification and to reduce the risks of devitrification, in these opal glasses, because the start of devitrification may produce nodules of glass, particularly of cristobalite, producing a glass of poor homogeneity which resists tempering badly. It is also to reduce these risks of devitrification that the lower limit was fixed for alumina. For the same reason it is advantageous to maintain a high temperature at all times in the glass before it is delivered to the mold. One should also avoid, generally, when making a glass as homogeneous as possible, introducing sulphates into the batch which perturb the fusion because of their low solubility in glasses of this composition. As I have indicated above, there are interrelations between the percentages of certain principal constituents of the glass of the invention which I have discovered are necessary to control the opalizing effect of some constituents and the anti-opalizing effect of others. Thus, the contents of $P_2O_5$ and CaO are related to the contents of $Na_2O$ or the other alkali oxides by the ratios $$\frac{M_2O}{P_2O_5} \text{ between about 2 and 3}$$

$$\frac{M_2O}{CaO} \text{ between about 6 and 11}$$

but especially I have demonstrated that it is advantageous to establish a content of $P_2O_5$ at the optimum value corresponding to the formation of lime phosphate, which constitutes the principal opalizing agent. Now, as $P_2O_5$ also plays a role in forming the glass, and this in a proportion which depends from the nature of the vitreous matrix, it is satisfactory to choose the weight percentages of $P_2O_5$, $SiO_2$ and $M_2O$ so that the value of the ratio $$\frac{P_2O_5 \times SiO_2}{M_2O}$$

shall be between 20 and 30.

The following examples of opal glass correspond to the invention and are particularly advantageous, on the one hand because the glass is easily molded and homogenized at reasonable temperatures and, on the other hand, because they produce at the same time an intense opalization and establish an internal condition which satisfactorily accomplishes tempering. The figures are in parts by weight:

| | $SiO_2$ | $B_2O_3$ | $Al_2O_3$ | $P_2O_5$ | CaO | MgO | $Na_2O$ | BaO |
|---|---|---|---|---|---|---|---|---|
| I | 60.7 | 12 | 8 | 5 | 1.5 | 0.8 | 12 | |
| II | 64.7 | 10 | 6 | 6 | 1.5 | 0.8 | 12 | |
| III | 66 | 12 | 8 | 3.5 | 1.5 | | 9 | |
| IV | 66.2 | 10 | 4.5 | 5 | .5 | 0.8 | 12 | |
| V | 66.2 | 11 | 4.5 | 4.75 | 1 | 0.55 | 11 | |
| VI | 66.2 | 8 | 4.5 | 5.25 | 2 | 1.05 | 13 | 1 |

In all of these glasses opalization is developed under industrial conditions of manufacture, and the glasses have a constitution which withstands energetic tempering. The manufacture of these glasses does not require too high a temperature and can be carried out with entire satisfaction either in pots or in furnaces of basin type. They do not pollute the atmosphere. These glasses are satisfactory for shaping and molding by hand and also by automatic machine.

Among the mechanical and thermal characteristics inherent in these glasses, beyond their ability to withstand tempering, are very good chemical durability, satisfactory manufacture into culinary articles, and the capacity to be colored throughout in various tones by adaptation of classical color formulae without developing defects of spotting, an advantage which is attributed to the fact that opalization takes place after the start of the shaping process. As an example, the addition of .075% by weight of CuO and .0012% CoO to any of the foregoing composition produces a blue tint in the glass, whereas the addition of .06% $Cr_2O_3$ and .0006% of CoO produces a green tone.

The following example describes the manufacture of opal glass articles by the process of this invention.

EXAMPLE VII

A tank type furnace was supplied with the composition:

|  | Kg. |
|---|---|
| Dry sand | 563 |
| Dolomite | 40 |
| Sodium carbonate | 43 |
| Dehydrated borax | 148 |
| Hydrated alumina | 52 |
| Sodium nitrate | 33 |
| Sodium tripolyphosphate | 80 |

The dolomite contained 32.7% CaO and 19.7% MgO.

The composition was melted at a temperature of about 1500° C. In the region of the forehearth, where the gobs are cut off, the temperature was of the order of 1230° C. to 1280° C. The gobs were molded in the usual way in automatic machines, of which the cadence was 25 to 35 moldings per minute. The molded articles were tempered after having been brought to thermal equilibrium at 700° C. to 720° C. The articles were dinner plates which were brought to equilibrium, suspended, heated above the deformation point and vigorously blown on both sides with currents of cold air until their temperature was below the strain point. The deformation point is generally between $10^{11}$ to $10^{12}$ poises and the strain point at $10^{14}$.

If it is desired to produce opaline articles of bluish tint, one may add to the composition being molded .646 kg. of copper oxide and .010 kg. of cobalt oxide without changing the operating conditions.

The composition of this glass, by weight percent, was $SiO_2$, 66.2%; $B_2O_3$, 10%; $Al_2O_3$, 4.5%; $P_2O_5$, 5%; CaO, 1.5%; MgO, 0.8%; $Na_2O$, 12%. To show the importance of the limits established for this invention, and especially the effect of CaO, it has been observed that if one were to replace a few percent of silica by lime, the other percentages remaining unchanged, the opalization of the glass is produced at much higher temperatures and begins in the feeder before it has fallen into the mold, producing an opal phase which is too coarse for even the formation of crystalline aggregates, and a glass which does not satisfactorily withstand tempering.

The advantages of the invention include the attainment of the objects of the invention, notably a batch which produces a novel glass under ordinary furnace conditions, which has inherent qualities superior to prior opal glasses, particularly in that these glasses can withstand tempering of sufficient violence to incorporate greatly increased strength.

As many apparently widely different embodiments of the present invention may be made without departing from the spirit and scope thereof, it is to be understood that the invention is not limited to the specific embodiments.

What is claimed is:

1. Opal glass consisting essentially by weight percent of: $SiO_2$—60 to 68%; $B_2O_3$—5 to 12%; $P_2O_5$—3 to 5.5%; $Al_2O_3$—4 to 8%; CaO—1 to 2%; and $M_2O$—9 to 13.5%, where $M_2O$ is at least one alkali metal oxide, the presence of $Na_2O$ being essential, the ratio by weight of $M_2O$ to $P_2O_5$ being in the range 2 to 3, and the ratio $M_2O$ to CaO being in the range 6 to 11.

2. A method of preparing temperable opal glass which comprises, preparing a glass consisting essentially by weight percent; $SiO_2$—60 to 68%; $B_2O_3$—5 to 12%; $P_2O_5$—3 to 5.5%; $Al_2O_3$—4 to 8%; CaO—1 to 2%, and $M_2O$—9 to 13.5%, $M_2O$ being at least one alkali metal oxide, the presence of $Na_2O$ being essential, the ratio by weight $M_2O$ to $P_2O_5$ being in the range 2 to 3, and the ratio $M_2O$ to CaO being in the range 6 to 11, by melting appropriate vitrifiable ingredients at about 1500° C., reducing the temperature to 600° C. to 900° C., and maintaining the viscosity above about 100,000 poises, thereby forming the opalescence in the glass, and cooling the glass.

3. Opal glass according to claim 1 in which the ratio $$\frac{P_2O_5 \times SiO_2}{M_2O}$$

is from 20 to 30.

4. A method according to claim 2 in which the ratio $$\frac{P_2O_5 \times SiO_2}{M_2O}$$

is from 20 to 30.

5. Opal glass according to claim 1 containing up to 1.5% of the oxides of the glass consisting of Ba, Mg, and Zn.

6. A batch for the manufacture of glass, consisting essentially of the following substances in approximate proportions of parts by weight:

| Dry sand | 563 |
|---|---|
| Dolomite | 40 |
| Sodium carbonate | 43 |
| Dehydrated borax | 148 |
| Hydrated alumina | 52 |
| Sodium nitrate | 33 |
| Sodium tripolyphosphate | 80 |

References Cited

UNITED STATES PATENTS

| 2,378,769 | 6/1945 | Hood | 106—54 |
| 2,434,139 | 1/1948 | Armistead | 106—54 |
| 3,241,935 | 3/1966 | Stookey | 106—39 X |

FOREIGN PATENTS 3,826,467  12/1963  Japan.

JAMES E. POER, Primary Examiner

W. R. SATTERFIELD, Assistant Examiner

U.S. Cl. X.R.

65—33; 106—54